United States Patent [19]

Bockrath et al.

[11] 4,130,551
[45] Dec. 19, 1978

[54] SOLID STATE POLYMERIZATION

[75] Inventors: Ronald E. Bockrath, Aurora; Carl Serres, Naperville, both of Ill.

[73] Assignee: Standard Oil Company (Indiana), Chicago, Ill.

[21] Appl. No.: 525,866

[22] Filed: Nov. 21, 1974

[51] Int. Cl.² .............................................. C08G 63/70
[52] U.S. Cl. ..................................... 528/481; 528/499
[58] Field of Search ........................... 260/75 T, 75 M

[56] References Cited

U.S. PATENT DOCUMENTS

| | | | |
|---|---|---|---|
| 3,334,070 | 8/1967 | Chezaud | 260/75 T |
| 3,816,377 | 6/1974 | Okuzumi | 260/75 M |
| 3,840,632 | 10/1974 | Maxion et al. | 260/75 M X |

Primary Examiner—Walter C. Danison
Attorney, Agent, or Firm—William H. Magidson; Arthur G. Gilkes; William T. McClain

[57] ABSTRACT

Solid state polymerization of relatively low I.V. polyester using a water-soluble anti-stick agent.

3 Claims, No Drawings

SOLID STATE POLYMERIZATION

This invention relates to solid-state polycondensation of polyesters bearing a water-soluble salt anti-stick agent. More particularly this invention relates to solid-state condensation of linear polyesters bearing a water-soluble salt followed by removing said water-soluble salt from said polymer with an aqueous medium.

Polyesters, particular polyethylene terephthalate and polybutylene terephthalate having a high I.V. (inherent viscosity) are commonly produced from low I.V. polyesters of the same composition by solid-state polymerization. U.S. Pat. No. 3,728,309 of Maxion points out that the solid phase polycondensation of polyesters has been held back mainly by the tendency of the polymer particles to agglomerate during solid-state polymerization. This patent discusses many of the techniques that have been employed to minimize agglomeration. In addition to the methods described in U.S. Pat. Nos. 3,728,309, 3,840,632 of Maxion et al. discloses that the polyester can be mixed with various minerals, inorganic oxides, etc. which function as anti-stick agents during the solid-state polymerization. While this latter technique overcomes many of the problems inherent in other solid-state polymerizations, this technique has the disadvantage that molded objects produced from the high I.V. solid-state polymers tend to be opaque or translucent due to the inorganic material. While the disadvantages implicit in the anti-stick agents of Maxion et al. can be overcome by the use of organic crystalline anti-stick agents of commonly assigned Ser. No. 511,166, filed Oct. 2, 1974, these organic anti-stick agents have some drawbacks, particularly when the final fabricated polymer is used in food packaging. For example, the solid-state polymerization must be carried out for a relatively long period to insure that the organic crystalline anti-stick agent cannot be leached out of the polymer by food products. If the anti-stick agent can be leached out, it is necessary to obtain approval of the anti-stick agent as an indirect food additive. Accordingly, there is a need for a new method of solid-state polymerization wherein the advantages of an anti-stick agent can be obtained without loss of clarity in the molded polyester resin.

The general object of this invention is to provide a method of producing high I.V. polyester resins by solid-state polymerization without agglomeration. A more specific object of this invention is to produce substantially clear high I.V. polyesters rapidly by solid-state polymerization without agglomeration and eliminating the presence of potential indirect food additive residues in the polymer. Other objects appear hereinafter.

For the purpose of this invention all I.V.s were determined in 60:40 phenol:tetrachloroethane at 30° C. and 0.4g/dl concentration.

Briefly, this invention comprises polymerizing under solid state polymerization conditions a polyester having a relatively low I.V. bearing a water-soluble salt. After solid state polymerization the water-soluble salt can be removed easily with an aqueous medium. Other things being equal, the solid state polymerization is faster than when a crystalline organic anti-stick agent of Ser. No. 511,166 is used. Further, a substantially clear molded object can be produced from the aqueous treated high I.V. polyester.

The anti-stick agents, which are water-soluble alkali metal or alkaline earth metal salts of organic and inorganic acids, can be used in a concentration of 0.05 to 10 parts by weight per 100 parts by weight polyester. Suitable water-soluble anti-stick agents include alkali metal halides (sodium chloride, potassium chloride), alkaline earth metal halides (calcium chloride, barium chloride, magnesium chloride) trisodium phosphate, monosodium dihydrogen phosphate, disodium sulphate, sodium acid sulfate, sodium carbonate, sodium acetate, sodium formate, etc. Of these, food acceptable salts and particularly sodium chloride, are preferred because of the food acceptability of any residues which may be left from incomplete washing or omission of washing of the solid state polymerized product.

Virtually any hydrophobic or water-insoluble polyester susceptible to solid state polymerization can be used in this invention in addition to polyethylene terephthalate and polybutylene terephthalate referred to above. For example, this technique can be employed for the polymerization of polyethylene-trimellitate imides having an I.V. of at least 0.3 of the type described in commonly assigned Ser. No. 432,569 of Golinkin et al., polybutylene 2,5-dibromoterephthalate, etc. However, the preferred polyesters have at least about 75 mol percent of their acid moieties provided by terephthalic acid and/or a naphthalene dicarboxylic acid (preferably 2,6-) while the diol moieties are provided by glycols such as ethylene glycol, butylene glycol, 1,4-dimethylol cyclohexane, etc., or aromatic diols, such as hydroquinone, Bisphenol A, etc. The polyester can also contain residues of other dicarboxylic acids such as adipic acid, isophthalic acid, sebacic acid, etc. In general, the preferred polyesters have an initial starting I.V. of at least 0.3 dl/g in a 60:40 phenol:tetrachloroethane at 30° C. and 0.4g/dl concentration, preferably 0.45 to about 0.7. Other things being equal, the lower the I.V. of the starting polyester the lower the melting point and the smaller the average particle size.

The starting polyesters to be utilized in this invention are typically prepared by melt polymerization techniques, and molten resin is generally converted from the amorphous to the crystalline state prior to solid-state polymerization in order to raise the sticking temperature of the starting polyester. Preferably the polyester is at least 20% crystalline. This crystallization can be accomplished by any suitable treatment such as slowly cooling an extruded or cast polymer melt to room temperature, or a quenched polymer melt in the amorphous state may be crystallized by a controlled heating treatment or by treating the solid polymer with organic solvent vapors or with steam as referred to in U.S. Pat. No. 3,728,309.

In the case of polyethylene terephthalate pre-polymers, the sticking temperature of crystalline or partially crystalline polyethylene terephthalate is about 230° C. in contrast with the usual range of about 100° to 150° C. for the amorphous state. Typically the polyester can be converted to about 20 to 40% crystallinity by heating at 150° C. for 5 to 300 minutes. At lower crystallization temperatures, longer heating times are generally desirable. Suitable time-relationships can be determined easily by observing the change in appearance of the particular polyester as it changes from translucent to opaque as an indication of substantial crystal formation in the polyester. Although the low I.V. polyester may be in the form of thin films filaments or ribbons, it is usually preferable to sub-divide the material as by flaking or chopping a film or sheet into thin pieces or by chopping or cutting films, ribbons or rods. The chopped material can be ground or pulverized to provide a fine powder for solid-state reaction. The particles may range from about 0.01 inch to 0.3 inch in diameter. However, the smaller the average diameter of the particles the faster the solid-state polymerization.

The polyester, whether crystallized, partially crystallized, or amorphous can be coated with about 0.05 to 10 parts by weight of the water-soluble salt anti-stick agent per each 100 parts by weight polyester in a ribbon type of blender, etc. After a homogeneous particulate composition is formed, the pellets or flakes of the resin can be polymerized under solid state conditions in a fluidized bed of fine particles and continuously maintained in motion by a flow of inert carrier gas such as nitrogen or the resin may be passed through a polymerization tower by gravity flow. Regardless of the system utilized a vacuum system or other provision should be made for removing the glycols, etc. liberated in the solid-state polymerization stage. Suitable solid-state polymerization temperatures can range from a temperature just above the threshold temperature of the polymerization reaction up to a temperature within a few degrees of the sticking temperature of the resin or its melting point. The reaction temperatures differ somewhat for polymers or co-polymers of different compositions and of different molecular weight.

Although it is preferred to employ a polyester having some crystallinity in the solid state polymerization process, amorphous polymers can be used advantageously where adequate agitation is provided. However, where there is no agitation or insufficient agitation such as in a static tower reactor, the polyesters must be at least 20% crystalline.

After solid state polymerization is complete, the higher I.V. polymer is generally separated from the water-soluble anti-stick agent by washing with an aqueous medium at a temperature of from 0° to 100° C. The polymer can be conveyed through an aqueous bath or sprayed with high pressure or low pressure water while supported on a porous substrate or screen. Virtually any techniques used to wash or extract water-soluble materials can be employed.

The following examples are merely illustrative.

EXAMPLE I

A 0.6 I.V. homopolymeric polyethylene terephthalate, having an average diameter of 0.06 inch to 0.09 inch was coated with 0.5 weight percent sodium chloride by tumbling the composition in a jar for one hour. The coated polyester was crystallized 40% by heating at 150° C. for 1.5 hours and placed in a cylindrical vessel. A nitrogen stream was passed up through the coated polyethylene terephthalate particles, at a rate of 570 centimeters per minute while maintaining the reactants at 240° C. for 8 hours. The particulate polyester was still free-flowing when it was removed from the cooled reactor and had an I.V. of 0.94 dl/g whereas a control run without the water-soluble anti-stick agent was much more agglomerated and difficult to remove from the reactor. When terephthalic acid was used as the anti-stick agent the polyester had an I.V. of 0.82 dl/g after 8 hours at 240° C.

The water-soluble salt was removed from the polyester of this example by stirring 400g of polymer in 500ml water at room temperature, filtering the solids off and repeating 4 times.

The washed 0.94 dl/g polyester produced by the method of this invention was molded into a clear bar having an I.V. of 0.86 dl/g. When this example was repeated using an inorganic anti-stick agent, molded bars were hazy and optically unclear.

EXAMPLE II

Essentially the same results were attained replacing the sodium chloride with sodium sulphate. The polyester had an I.V. of 1.00 dl/g.

EXAMPLE III

Essentially the same results were attained replacing the sodium chloride with sodium diacid phosphate. The polyester had an I.V. of 0.96 dl/g.

I claim:
1. The method of producing a relatively high inherent viscosity polyester resin without agglomeration which comprises polymerizing a polyester having an initial starting inherent viscosity of about 0.3 dl/g in 60:40 phenol:tetrachloroethane at 30° C. and at 0.4 dl/g under solid state polymerization conditions together with a sodium chloride anti-stick agent and removing said sodium chloride from the polyester after solid state polymerization with an aqueous medium, wherein the sodium chloride anti-stick agent is present in a concentration of 0.05 to 10 parts by weight per each 100 parts by weight polyester.
2. The process of claim 1, wherein at least 75 mol percent of the acid moieties in the polyester are provided by terephthalic acid and/or naphthalene, 2,6-dicarboxylic acid.
3. The process of claim 2 wherein said polyester is at least 20% crystalline.

UNITED STATES PATENT OFFICE
CERTIFICATE OF CORRECTION

Patent No. 4,130,551      Dated December 19, 1978

Inventor(s) Ronald E. Bockrath and Carl Serres

It is certified that error appears in the above-identified patent and that said Letters Patent are hereby corrected as shown below:

Patent
| Column | Line | |
|---|---|---|
| 4 | 35 | "0.3 dl/g in" should be -- 0.3 to 0.7 dl/g in -- |

Signed and Sealed this

Twenty-ninth Day of May 1979

[SEAL]

Attest:

RUTH C. MASON
*Attesting Officer*

DONALD W. BANNER
*Commissioner of Patents and Trademarks*